United States Patent
Rao et al.

(10) Patent No.: US 12,182,605 B2
(45) Date of Patent: Dec. 31, 2024

(54) SYSTEMS AND METHODS FOR REGENERATING A TERMINATED APPLICATION INSTANCE OF A CONTAINERIZED APPLICATION

(71) Applicant: Pure Storage, Inc., Mountain View, CA (US)

(72) Inventors: Goutham Rao, Los Altos Hills, CA (US); Vinod Jayaraman, San Francisco, CA (US); Ganesh Sangle, Sunnyvale, CA (US)

(73) Assignee: Pure Storage, Inc., Santa Clara, CA (US)

( * ) Notice: Subject to any disclaimer, the term of this patent is extended or adjusted under 35 U.S.C. 154(b) by 25 days.

(21) Appl. No.: 18/083,294

(22) Filed: Dec. 16, 2022

(65) Prior Publication Data

US 2024/0201846 A1    Jun. 20, 2024

Related U.S. Application Data

(63) Continuation of application No. 16/776,036, filed on Jan. 29, 2020, now Pat. No. 11,567,790, which is a continuation of application No. 15/874,118, filed on Jan. 18, 2018, now Pat. No. 10,585,694.

(51) Int. Cl.
| | | |
|---|---|---|
| G06F 9/455 | (2018.01) | |
| G06F 3/06 | (2006.01) | |
| H04L 67/01 | (2022.01) | |
| H04L 67/1097 | (2022.01) | |

(52) U.S. Cl.
CPC ........ *G06F 9/45558* (2013.01); *G06F 3/0601* (2013.01); *G06F 3/0629* (2013.01); *G06F 3/0664* (2013.01); *G06F 9/45533* (2013.01); *H04L 67/1097* (2013.01); *G06F 2009/45562* (2013.01); *G06F 2009/45579* (2013.01); *H04L 67/01* (2022.05)

(58) Field of Classification Search
CPC ................................ G06F 9/455; H04L 43/08
See application file for complete search history.

(56) References Cited

U.S. PATENT DOCUMENTS

| | | |
|---|---|---|
| 6,654,737 B1 | 11/2003 | Nunez |
| 7,975,115 B2 | 7/2011 | Wayda et al. |
| 8,495,472 B1 | 7/2013 | Magerramov et al. |
| 8,504,797 B2 | 8/2013 | Mimatsu |

(Continued)

OTHER PUBLICATIONS

Castro, et al.,"Optimal Scheduling of Pipeline Systems with a Resource—Task Network Continuous-Time Formulation", Industrial & engineering chemistry research vol. 49.22 (2010): 11491-11505.

(Continued)

*Primary Examiner* — Getente A Yimer
(74) *Attorney, Agent, or Firm* — ALG Intellectual Property, LLC (57) ABSTRACT

An illustrative method includes determining that a first application instance of an application is terminated, instantiating, in response to the determining that the first application instance of the application is terminated, a second application instance of the application, identifying one or more particular storage volumes based on the first application instance, and attaching the one or more particular storage volumes to the second application instance.

18 Claims, 7 Drawing Sheets

(56) References Cited

U.S. PATENT DOCUMENTS

| | | |
|---|---|---|
| 8,706,914 B2 | 4/2014 | Duchesneau |
| 8,822,155 B2 | 9/2014 | Sukumar et al. |
| 8,918,478 B2 | 12/2014 | Ozzie et al. |
| 9,047,352 B1* | 6/2015 | Dong .................. G06F 16/144 |
| 9,256,440 B1 | 2/2016 | Cattaneo |
| 9,275,063 B1 | 3/2016 | Natanzon |
| 9,280,678 B2 | 3/2016 | Redberg |
| 9,367,366 B2 | 6/2016 | Xiong et al. |
| 9,395,922 B2 | 7/2016 | Nishikido et al. |
| 9,495,142 B2 | 11/2016 | Koushik et al. |
| 9,552,299 B2 | 1/2017 | Stalzer |
| 9,563,385 B1 | 2/2017 | Kowalski et al. |
| 9,594,548 B2 | 3/2017 | Pena |
| 9,740,403 B2 | 8/2017 | Storer et al. |
| 9,848,041 B2 | 12/2017 | Einkauf et al. |
| 9,864,874 B1 | 1/2018 | Shanbhag et al. |
| 9,946,578 B2 | 4/2018 | Huang et al. |
| 10,025,673 B1 | 7/2018 | Maccanti et al. |
| 10,102,356 B1 | 10/2018 | Sahin et al. |
| 10,185,495 B2 | 1/2019 | Katsuki |
| 10,289,320 B1 | 5/2019 | Wigmore |
| 10,324,639 B2 | 6/2019 | Seo |
| 10,432,713 B2 | 10/2019 | Gahlot et al. |
| 10,440,132 B2 | 10/2019 | Stickle |
| 10,489,268 B2 | 11/2019 | Rao et al. |
| 10,503,441 B2 | 12/2019 | Israni et al. |
| 10,567,406 B2 | 2/2020 | Astigarraga et al. |
| 10,579,364 B2 | 3/2020 | Doshi et al. |
| 10,585,694 B2 | 3/2020 | Rao et al. |
| 10,659,523 B1 | 5/2020 | Joseph et al. |
| 10,664,255 B2 | 5/2020 | Simharajan et al. |
| 10,747,730 B2 | 8/2020 | Dimitrov et al. |
| 10,776,173 B1 | 9/2020 | Greenwood |
| 10,810,088 B1 | 10/2020 | Gu et al. |
| 10,831,540 B2 | 11/2020 | Israni et al. |
| 10,846,137 B2 | 11/2020 | Vallala et al. |
| 10,877,683 B2 | 12/2020 | Wu et al. |
| 10,963,349 B2 | 3/2021 | Dhamdhere et al. |
| 10,972,355 B1 | 4/2021 | Bauer et al. |
| 11,016,699 B2 | 5/2021 | Anchi et al. |
| 11,038,986 B1 | 6/2021 | Acar et al. |
| 11,061,584 B2 | 7/2021 | Kowalski et al. |
| 11,106,810 B2 | 8/2021 | Natanzon et al. |
| 11,216,220 B2 | 1/2022 | Israni et al. |
| 11,226,847 B2 | 1/2022 | Alluboyina et al. |
| 11,363,117 B2 | 6/2022 | Acar et al. |
| 11,388,234 B2 | 7/2022 | Alagna et al. |
| 2009/0043740 A1 | 2/2009 | Olsen |
| 2010/0281479 A1 | 11/2010 | Larkin et al. |
| 2011/0022943 A1 | 1/2011 | Bou-Ghannam et al. |
| 2011/0035540 A1 | 2/2011 | Fitzgerald et al. |
| 2013/0086585 A1 | 4/2013 | Huang et al. |
| 2014/0236948 A1 | 8/2014 | Somogyi et al. |
| 2014/0258506 A1 | 9/2014 | Stickle |
| 2014/0379901 A1* | 12/2014 | Tseitlin .................. H04L 43/08 709/224 |
| 2016/0132310 A1 | 5/2016 | Koushik et al. |
| 2017/0060558 A1 | 3/2017 | Koushik et al. |
| 2017/0126686 A1 | 5/2017 | Totov |
| 2017/0147243 A1 | 5/2017 | Kowalski et al. |
| 2017/0168778 A1* | 6/2017 | Brandys .................. G06F 8/60 |
| 2018/0150234 A1 | 5/2018 | Karmarkar et al. |
| 2019/0065323 A1 | 2/2019 | Dhamdhere et al. |
| 2019/0163405 A1* | 5/2019 | Israni .................. G06F 3/0659 |
| 2019/0220266 A1 | 7/2019 | Doshi et al. |
| 2019/0220297 A1* | 7/2019 | Rao .................. G06F 9/45558 |
| 2019/0266022 A1 | 8/2019 | Israni et al. |
| 2019/0370023 A1* | 12/2019 | Israni .................. G06F 3/065 |
| 2020/0167185 A1 | 5/2020 | Rao et al. |
| 2020/0183621 A1 | 6/2020 | Israni et al. |
| 2021/0064442 A1 | 3/2021 | Alluboyina et al. |
| 2021/0099410 A1 | 4/2021 | Badr et al. |
| 2021/0297504 A1 | 9/2021 | Acar et al. |
| 2021/0377248 A1 | 12/2021 | Brainer |
| 2021/0389990 A1 | 12/2021 | Nakamura et al. |
| 2022/0083283 A1 | 3/2022 | Israni et al. |
| 2022/0114037 A1* | 4/2022 | Jobi .................. G06F 9/455 |
| 2022/0124150 A1 | 4/2022 | Alagna et al. |
| 2022/0179576 A1 | 6/2022 | Saad et al. |
| 2022/0179671 A1 | 6/2022 | Seetala et al. |
| 2022/0342707 A1 | 10/2022 | Alagna et al. |
| 2022/0391359 A1 | 12/2022 | Dronamraju et al. |

OTHER PUBLICATIONS

Hwang, et al.,"RAID-x: A New Distributed Disk Array for I/O-Centric Cluster Computing", Proceedings the Ninth International Symposium on High-Performance Distributed Computing, 2000, pp. 279-286.

Stalzer, et al., "FlashBlades: System Architecture and Applications", Proceedings of the 2nd Workshop on Architectures and Systems for Big Data, Association for Computing Machinery, New York, NY, 2012, pp. 10-14.

Storer, et al.,"Pergamum: Replacing Tape with Energy Efficient, Reliable, Disc-Based Archival Storage", FAST'08: Proceedings of the 6th USENIX Conference on File and Storage Technologies, Feb. 2008, Article No. 1, pp. 1-16.

\* cited by examiner

SYSTEMS AND METHODS FOR REGENERATING A TERMINATED APPLICATION INSTANCE OF A CONTAINERIZED APPLICATION

RELATED APPLICATIONS

The present application is a continuation of U.S. patent application Ser. No. 16/776,036, filed Jan. 29, 2020, which is a continuation of U.S. patent application Ser. No. 15/874,118, filed Jan. 18, 2018, each of which is incorporated herein by reference in its entirety and for all purposes.

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. However, the implementation of such software containers in distributed contexts remains limited.

SUMMARY

Systems, devices, and methods are disclosed herein for containerized scalable storage applications. Methods may include instantiating an application instance based on a plurality of application instance parameters, the application instance being configured to utilize a plurality of storage volumes implemented in a storage cluster. Methods may also include enumerating a plurality of unattached storage volumes included in the cluster associated with the application instance, the plurality of unattached storage volumes having a plurality of underlying physical storage devices, and the plurality of unattached storage volumes being identified based on a plurality of application instance parameters. The methods may further include attaching at least some of the plurality of unattached storage volumes to the application instance, wherein the attaching enables the application instance to access data stored in the attached storage volumes.

In various embodiments, the application instance is instantiated by a scalable web services provider, and the attaching is implemented by a containerized storage service provider. According some embodiments, the application instance parameters are determined based on an application template. In various embodiments, the application instance parameters are selected from a group consisting of storage characteristics, input/output (I/O) characteristics, and operating system type. In some embodiments, the attaching is based on custom labels associating at least some of the plurality of the storage volumes with an application underlying the application instance. According some embodiments, the methods may also include generating a new storage volume based, at least in part, on the application instance parameters, and attaching the new storage volume to the application instance. In various embodiments, the application instance is a database application. In some embodiments, the application instance is a containerized scalable storage application. According some embodiments, the plurality of storage volumes is implemented on a plurality of storage container nodes in at least one storage container node cluster.

Further disclosed herein are systems that may include a plurality of storage devices configured to implement a plurality of storage volumes in at least one cluster of storage volumes. The systems may also include a processor configured to instantiate an application instance based on a plurality of application instance parameters, the application instance being configured to utilize at least some of the plurality of storage volumes implemented in the cluster. The processor may be further configured to enumerate a plurality of unattached storage volumes included in the cluster associated with the application instance, the plurality of unattached storage volumes being identified based on a plurality of application instance parameters. The processor may also be configured to attach at least some of the plurality of unattached storage volumes to the application instance, where the attaching enables the application instance to access data stored in the attached storage volumes.

In some embodiments, the application instance is instantiated by a scalable web services provider, and wherein the attaching is implemented by a containerized storage service provider. According some embodiments, the application instance parameters are determined based on an application template. In various embodiments, the application instance parameters are selected from a group consisting of storage characteristics, input/output (I/O) characteristics, and operating system type. In some embodiments, the attaching is based on custom labels associating at least some of the plurality of the storage volumes with an application underlying the application instance. According some embodiments, the processor is further configured to generate a new storage volume based, at least in part, on the application instance parameters, and attach the new storage volume to the application instance.

Also disclosed herein are one or more non-transitory computer readable media having instructions stored thereon for performing a method, the method including instantiating an application instance based on a plurality of application instance parameters, the application instance being configured to utilize a plurality of storage volumes implemented in a storage cluster. The method may also include enumerating a plurality of unattached storage volumes included in the cluster associated with the application instance, the plurality of unattached storage volumes having a plurality of underlying physical storage devices, and the plurality of unattached storage volumes being identified based on a plurality of application instance parameters. The method may further include attaching at least some of the plurality of unattached storage volumes to the application instance, where the attaching enables the application instance to access data stored in the attached storage volumes.

In some embodiments, the application instance is instantiated by a scalable web services provider, and the attaching is implemented by a containerized storage service provider. According some embodiments, the attaching is based on custom labels associating at least some of the plurality of the storage volumes with an application underlying the application instance. In various embodiments, the method further includes generating a new storage volume based, at least in part, on the application instance parameters, and attaching the new storage volume to the application instance. In some embodiments, the application instance is a containerized scalable storage application.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein provide for implementing application instances in a cluster in both stateless and stateful manners, and within a containerized storage node deployed system. In various embodiments, application instances may be created, and unattached storage volumes associated with the application instance may be identified. If there are unattached storage volumes that match parameters of the application instance, the storage volumes may be assigned to the application instance. Such volumes may be given cluster node identifiers and have cluster properties embedded within them. If there are no available storage volumes, they may be created in a manner consistent with cluster parameters, and such new storage volumes and their associated nodes may be initialized as a new cluster node joining the cluster. Accordingly, as will be discussed in greater detail below, distributed data storage systems may be configured to implement stateless and stateful applications that may seamlessly terminate and rejoin the cluster. In this way, various embodiments disclosed herein provide cluster-wide rules that enable application instances to be implemented as both stateless and stateful applications such that a terminated stateful node may safely come back and join the cluster without having to rebuild lost data.

EXAMPLE EMBODIMENTS

Techniques and mechanisms described herein may facilitate the configuration of a scalable storage container node system. In some embodiments, a scalable storage container node system may allow application containers in a virtualized application system to quickly and directly provision and scale storage. Further, the system may be configured to provide one or more user experience guarantees across classes of applications.

According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments.

In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

In a cloud computing environment, a distributed application can include potentially many different instances to provide redundancy and/or to aggregate resources across many different machines. Each machine is referred to as a node. Accordingly, a node may be a real or virtual CPU and some temporary memory. However, a node can be attached to some number of storage volumes located, which may be located physically separate from the node.

In various embodiments, a "state" of the application instance depends on data stored on storage volumes to which the application node is associated. For example, the state of a storage node depends on the data stored in the storage volume to which the storage node is attached. As another example, the state of a data storage or database application depends on the data stored in its attached storage volumes.

As similarly discussed above, nodes may fail for various reasons. Such reasons may include hardware failure, software failure, as well as various other operational or environmental factors, such as power outages or catastrophic losses. In a conventional system, a cloud computing environment can be configured to restart a failed node. However, when restarting a failed node, the cloud computing environment does not automatically reattach storage volumes. Indeed, the node that is "restarted" may be on a completely different machine than the node that failed. Accordingly, a restarted storage node might be unusable because it has no storage space attached. Moreover, a restarted application node loses its associated state information. As will be discussed in greater detail below, the failure of a node may also be associated with, or cause, the failure of an application instance implemented on that node. Accordingly, the application instance, which may be any suitable application implemented on the node in a clustered environment, may be terminated unexpectedly, and underlying physical storage devices may be unexpectedly orphaned. Thus, if the application instance is restarted, the previously stored data may be lost.

According to various embodiments described herein, application instances may have associated parameters that may be used to identify and attach one or more storage volumes. As will be discussed in greater detail below, the restarted storage node or application instance may be able to attach itself to one or more storage volumes. In various embodiments, the storage volume may be any available storage volume. As similarly discussed above, an application's state might not be restored. This may be acceptable for stateless applications, such as may be the case with a web server. In other examples, a storage volume may be a specific volume that the node that failed was attached to. Accordingly, as will be discussed in greater detail below, a newly created node may be provided with access to the same data of that storage volume. In this way, a new node that is started may then be set to the same state as the node that filed, and application instances implemented as disclosed herein may be restarted and reattached with underlying physical devices in a stateful manner.

Figure 1:
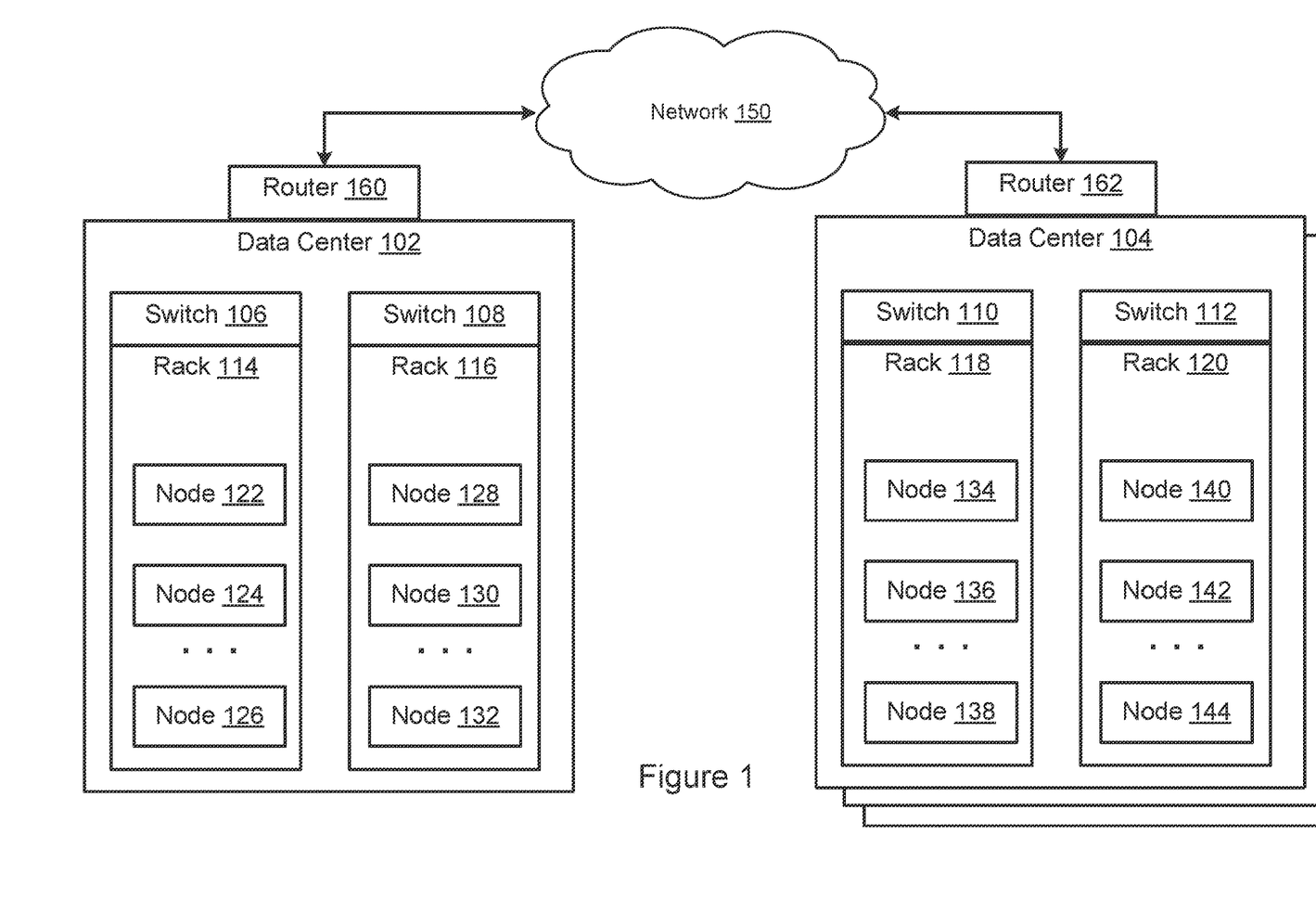
FIG. 1 illustrates an example of an arrangement of components in a containerized storage system.

FIG. 1 illustrates an arrangement of components in a containerized storage system. As will be discussed in greater detail below, such an arrangement of components may be configured such that clustered data storage is implemented, and copies of data stored at a particular storage container node within the cluster may be propagated amongst various other storage container nodes such that multiple copies of the data are available in case one of the storage container nodes fails. In various embodiments, and as will be discussed in greater detail below, such nodes may be implemented in conjunction with application instances, and may provide failover protection and stateful operation of such application instances.

Accordingly, in various embodiments, nodes may be implemented in various data centers, such as data center 102 and data center 104. As similarly discussed above, a data center may include networked computing devices that may be configured to implement various containerized applications, such as storage nodes discussed in greater detail below. In various embodiments, such data centers and storage nodes may be configured to implement clustered storage of data. As discussed in greater detail below, the clustered storage of data may utilize one or more storage container nodes that are collectively configured to aggregate and abstract storage resources for the purpose of performing storage-related operations. Accordingly, data centers, such as data center 102 and data center 104 may each include various nodes underlying data clusters which may be implemented within a data center or across multiple data centers.

As discussed above, the data centers may include various nodes. For example, data center 102 may include node 122, node 124, node 126, node 128, node 130, and node 132. Moreover, data center may include additional nodes, such as node 134, node 136, node 138, node 140, node 142, and node 144. Such nodes may be physical nodes underlying storage nodes and storage volumes discussed in greater detail below. As shown in FIG. 1, nodes may be included in racks, such as rack 114, rack 116, rack 118, and rack 120. In various embodiments, each rack may be coupled with a switch, such as switch 106, switch 108, switch 110, and switch 112. Such switches may manage the flow of data amongst nodes within a particular rack.

Data centers and components within data centers, such as racks including nodes and their associated switches, may be coupled with routers, such as router 160 and router 162. In various embodiments, such routers may manage the flow of data between data centers and other components that may be coupled with a network, such as network 150. In some embodiments, network 150 may be, at least in part, a local network, or may be a global network such as the internet.

Accordingly, network 150 may include numerous components and communications pathways that couple data centers with each other.

Figure 2:
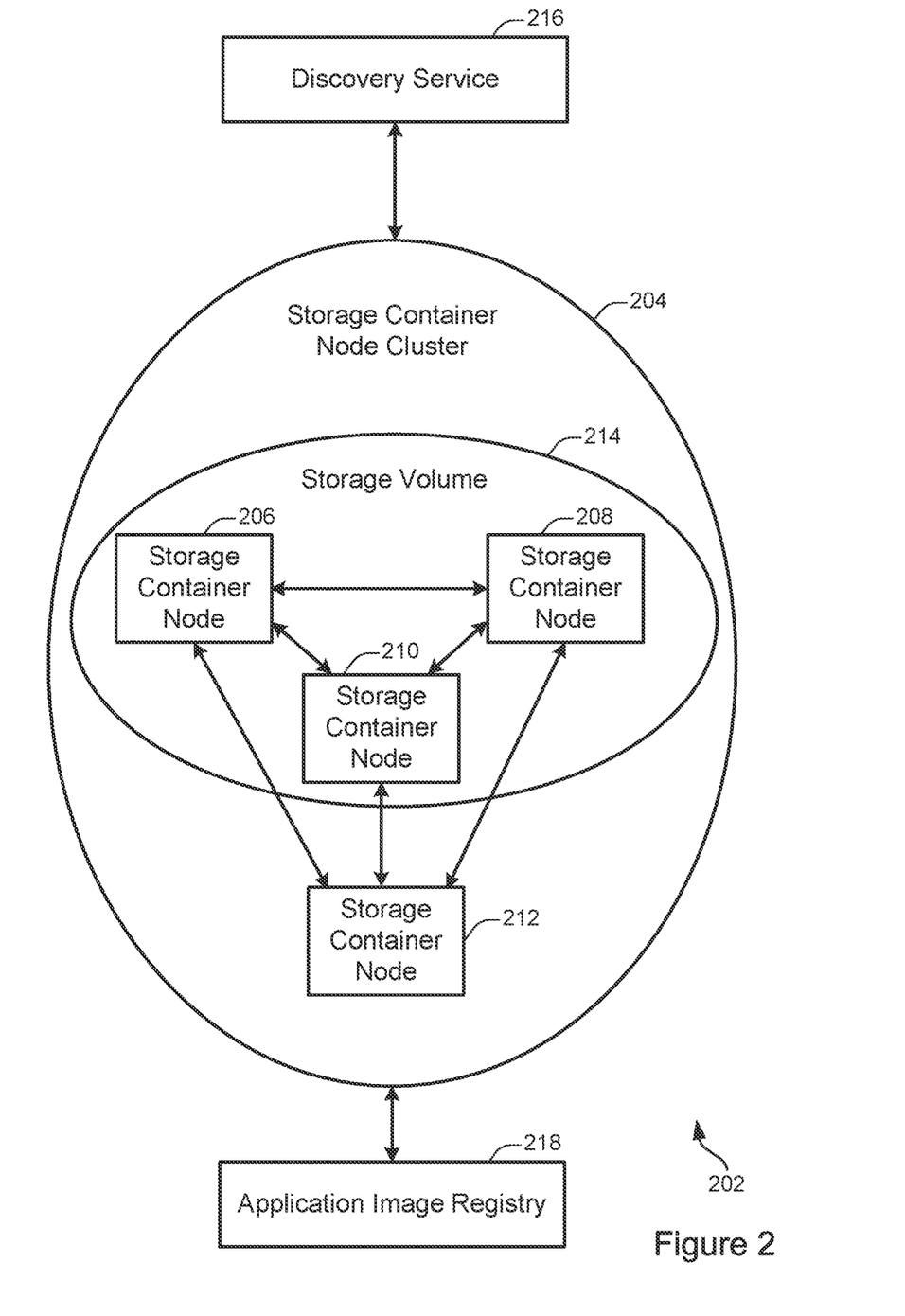
FIG. 2 illustrates an example of a scalable storage container node system, configured in accordance with one or more embodiments.

FIG. 2 illustrates an example of a scalable storage container node system 202. In some embodiments, the scalable storage container node system 202 may be capable of providing storage operations within the context of one or more servers configured to implement a container system. The scalable storage container node system 202 includes a storage container node cluster 204, which includes storage container nodes 206, 208, 210, and 212. The storage container nodes 206, 208, and 210 are combined to form a storage volume 214. The scalable storage container node system 202 also includes a discovery service 216 and an application image layer registry 218.

At 204, the storage container node cluster 204 is shown. According to various embodiments, a storage container node cluster may include one or more storage container nodes collectively configured to aggregate and abstract storage resources for the purpose of performing storage-related operations. Although the scalable storage container node system 202 shows only a single storage container node cluster, implementations of the techniques discussed herein may frequently include thousands or millions of storage container node clusters in a scalable storage container node system.

At 206, 208, 210, and 212, storage container nodes are shown. A storage container node may be configured as discussed with respect to the storage container node 202 shown in FIG. 202 or may be arranged in a different configuration. Each storage container node may include one or more privileged storage container such as the privileged storage container 216 shown in FIG. 2.

According to various embodiments, storage container nodes may be configured to aggregate storage resources to create a storage volume that spans more than one storage container node. By creating such a storage volume, storage resources such as physical disk drives that are located at different physical servers may be combined to create a virtual volume that spans more than one physical server.

The storage volume may be used for any suitable storage operations by other applications. For example, the containers 210, 212, and/or 214 shown in FIG. 2 may use the storage volume for storing or retrieving data. As another example, other applications that do not exist as containers may use the storage volume for storage operations.

In some implementations, the storage volume may be accessible to an application through a container engine, as discussed with respect to FIG. 2. For instance, a privileged storage container located at the storage container node 206 may receive a request to perform a storage operation on a storage volume that spans multiple storage nodes, such as the nodes 206, 208, 210, and 212 shown in FIG. 2. The privileged storage container may then coordinate communication as necessary among the other storage container nodes in the cluster and/or the discovery service 216 to execute the storage request.

At 214, a storage volume is shown. According to various embodiments, a storage volume may act as a logical storage device for storing and retrieving data. The storage volume 214 includes the storage container nodes 206, 208, and 210. However, storage volumes may be configured to include various numbers of storage container nodes. A storage volume may aggregate storage resources available on its constituent nodes. For example, if each of the storage container nodes 206, 208, and 210 include 2 terabytes of physical data storage, then the storage volume 214 may be configured to include 6 terabytes of physical data storage.

In some implementations, a storage volume may provide access to data storage for one or more applications. For example, a software application running on any of storage container nodes 206-212 may store data to and/or retrieve data from the storage volume 214. As another example, the storage volume 214 may be used to store data for an application running on a server not shown in FIG. 2.

At 216, a discovery service is shown. According to various embodiments, the discovery service may be configured to coordinate one or more activities involving storage container node clusters and/or storage container nodes. For example, the discovery service may be configured to initialize a new storage container node cluster, destroy an existing storage container node cluster, add or remove a storage container node from a storage container node cluster, identify which node or nodes in a storage container node cluster are associated with a designated storage volume, and/or identify the capacity of a designated storage volume.

In some implementations, a discovery service may be configured to add a storage container node to a storage container node cluster. An example of such a method is described in additional detail with respect to FIG. 4. In some implementations, a discovery service may be configured to facilitate the execution of a storage request.

According to various embodiments, the discovery service may be configured in any way suitable for performing coordination activities. For instance, the discovery service may be implemented as a distributed database divided among a number of different discovery service node. The discovery service may include a metadata server that store information such as which storage container nodes correspond to which storage container node clusters and/or which data is stored on which storage container node. Alternately, or additionally, the metadata server may store information such as which storage container nodes are included in a storage volume.

Figure 3:
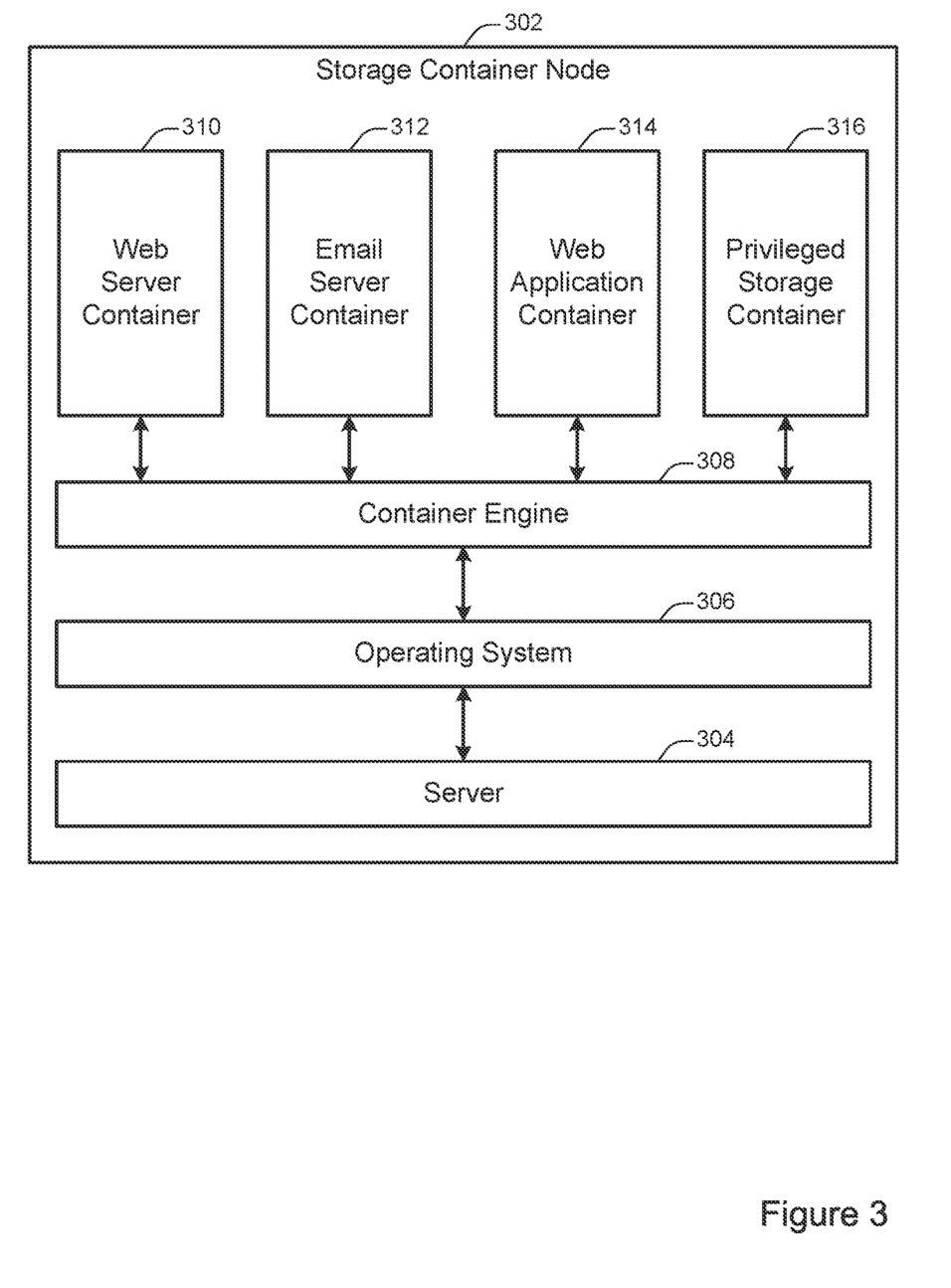
FIG. 3 illustrates an example of a storage container node, configured in accordance with one or more embodiments.

FIG. 3 illustrates an example of a storage container node 302. According to various embodiments, a storage container node may be a server configured to include a container engine and a privileged storage container. The storage container node 302 shown in FIG. 3 includes a server layer 304, an operating system layer 306, a container engine 308, a web server container 310, an email server container 312, a web application container 314, and a privileged storage container 316.

In some embodiments, the storage container node 302 may serve as an interface between storage resources available at a server instance and one or more virtual storage volumes that span more than one physical and/or virtual server. For example, the storage container node 302 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 304, the server layer is shown. According to various embodiments, the server layer may function as an interface by which the operating system 306 interacts with the server on which the storage container node 302 is implemented. A storage container node may be implemented on a virtual or physical server. For example, the storage container node 302 may be implemented at least in part on the server shown in FIG. 5. The server may include hardware such as networking components, memory, physical storage devices, and other such infrastructure. The operating system layer 306 may communicate with these devices through a standardized interface provided by the server layer 304.

At 306, the operating system layer is shown. According to various embodiments, different computing environments may employ different operating system layers. For instance, a physical or virtual server environment may include an operating system based on Microsoft Windows, Linux, or Apple's OS X. The operating system layer 306 may provide, among other functionality, a standardized interface for communicating with the server layer 304.

At 308, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 304, an operating system layer 306, and a container engine layer 308 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 302 includes the web server container 220, the email server container 312, and the web application container 314. A software container may include customized computer code configured to perform any of various tasks. For instance, the web server container 220 may provide files such as webpages to client machines upon request. The email server 312 may handle the receipt and transmission of emails as well as requests by client devices to access those emails. The web application container 314 may be configured to execute any type of web application, such as an instant messaging service, an online auction, a wiki, or a webmail service. Although that storage container node 302 shown in FIG. 3 includes three software containers, other storage container nodes may include various numbers and types of software containers.

At 316, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 312, and 314 or other software containers located in different computing environments. For example, a software container may transmit a storage request to the container engine 308 via a standardized interface. The container engine 308 may transmit the storage request to the privileged storage container 316. The privileged storage container 316 may then communicate with privileged storage containers located on other storage container nodes and/or may communicate with hardware resources located at the storage container node 302 to execute the request.

In some implementations, one or more software containers may be afforded limited permissions in the computing environment in which they are located. For example, in order to facilitate a containerized software environment, the software containers 310, 312, and 314 may be restricted to communicating directly only with the container engine 308 via a standardized interface. The container engine 308 may then be responsible for relaying communications as necessary to other software containers and/or the operating system layer 306.

In some implementations, the privileged storage container 316 may be afforded additional privileges beyond those afforded to ordinary software containers. For example, the privileged storage container 316 may be allowed to communicate directly with the operating system layer 306, the server layer 304, and/or one or more physical hardware components such as physical storage devices. Providing the storage container 316 with expanded privileges may facilitate efficient storage operations such as storing, retrieving, and indexing data.

Figure 4:
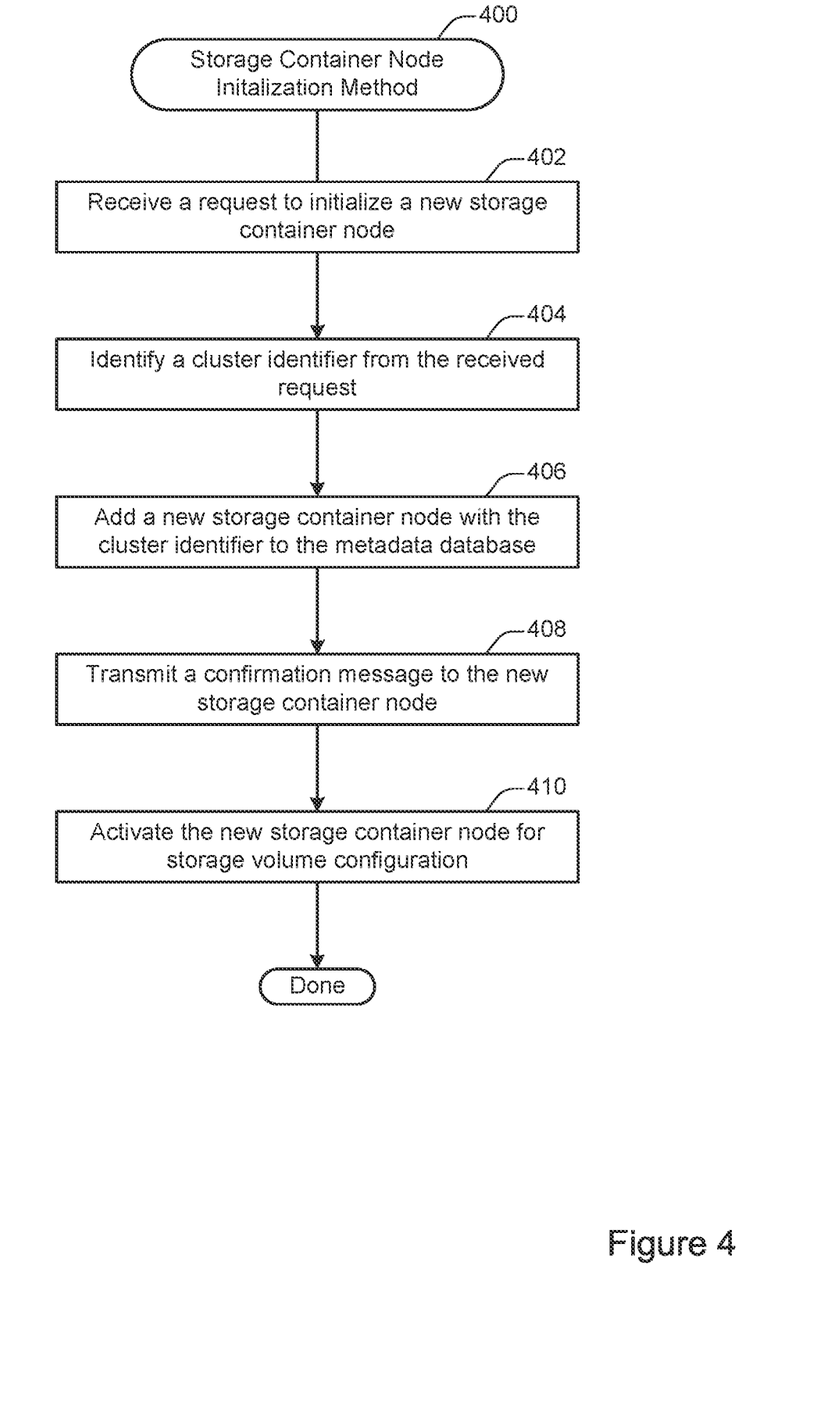
FIG. 4 illustrates a flow chart of an example of a method for initializing a new storage container node within a storage container node cluster, performed in accordance with one or more embodiments.

FIG. 4 illustrates an example of a method 400 for initializing a new storage container node within a storage container node cluster, performed in accordance with one or more embodiments. The method 400 may be performed at a discovery service such as the discovery service 116 shown in FIG. 1.

At 402, a request to initialize a new storage container node is received. According to various embodiments, the request to initialize a new storage container node may be generated when a storage container node is activated. For instance, an administrator or configuration program may install a storage container on a server instance that includes a container engine to create a new storage container node. The administrator or configuration program may than provide a cluster identifier indicating a cluster to which the storage container node should be added. The storage container node may then communicate with the discovery service to complete the initialization.

At 404, a cluster identifier is identified from the received request. According to various embodiments, the cluster identifier may be included with the received request. Alternately, or additionally, a cluster identifier may be identified in another way, such as by consulting a configuration file.

At 406, a new storage container node with the cluster identifier is added to the metadata database. In some implementations, the metadata database may be implemented at the discovery service and may include various types of information for configuring the storage container node system. The metadata database may identify one or more clusters corresponding to each storage container node. For example, the metadata database may include a row of data that includes both the cluster identifier and an identifier specific to the new storage container node.

At 408, a confirmation message is transmitted to the new storage container node. According to various embodiments, the confirmation message may indicate to the new storage container node that initialization was successful and that the new storage container node is ready to be included in a storage container volume.

At 410, the new storage container node is activated for storage volume configuration. According to various embodiments, activating a storage container node for storage volume configuration may include responding to one or more requests to add the storage container node to a storage volume. For instance, an administrator or configuration program may transmit a request to the discovery service to add the new storage container node to a designated storage volume. The discovery service may then update configuration information in the metadata server to indicate that the designated storage volume includes the new storage container node. Then, the discovery service may direct subsequent requests involving the designated storage volume to the new storage container node or any other storage container node associated with the designated storage volume.

Figure 5:
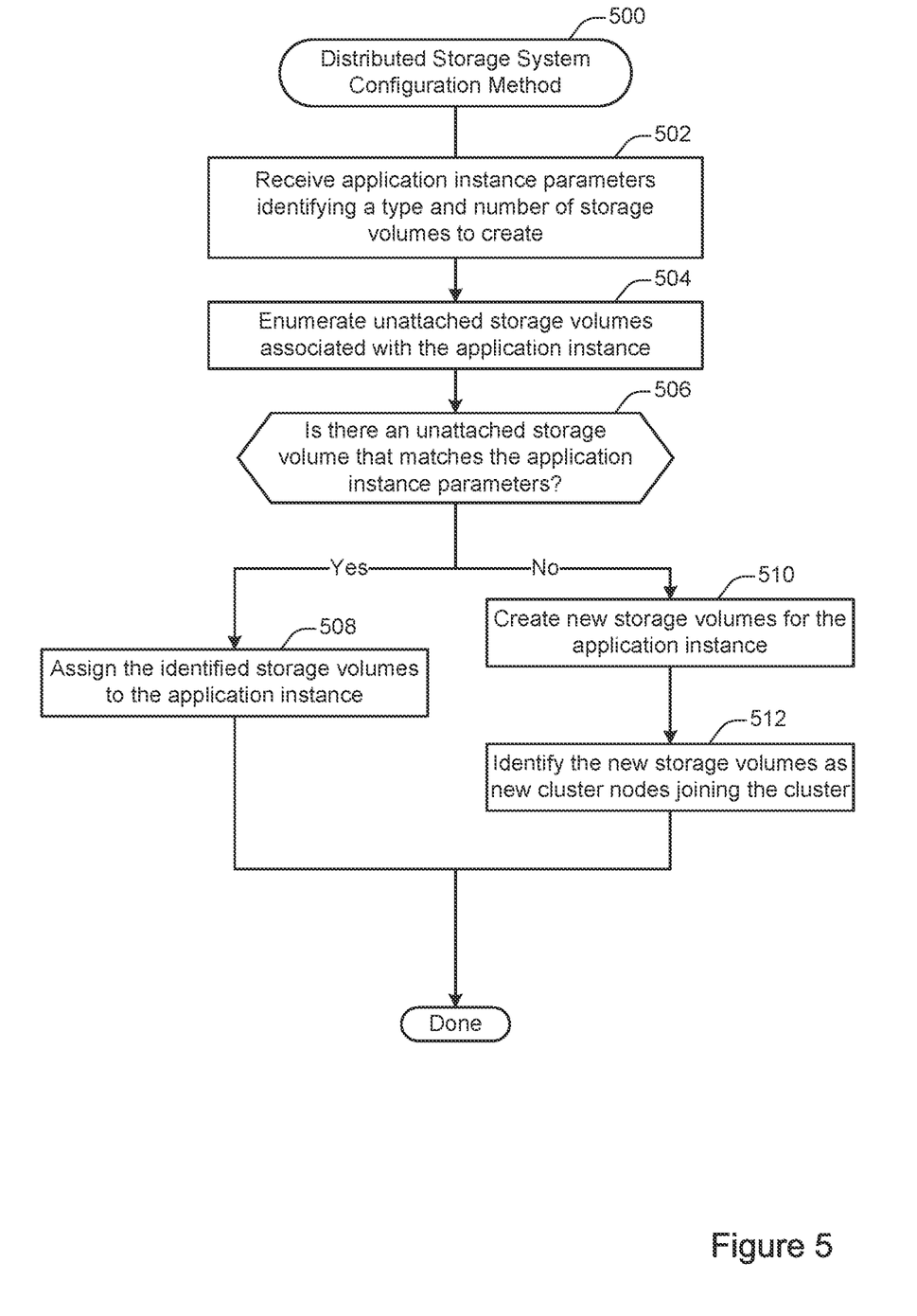
FIG. 5 illustrates a flow chart of an example of a method for configuring a distributed storage system, performed in accordance with one or more embodiments.

FIG. 5 illustrates a flow chart of an example of a method for configuring a distributed storage system. As similarly discussed above and as will be discussed in greater detail below, distributed storage systems as disclosed herein may be utilized to implement storage container nodes and storage volumes that may be utilized by application instances, such as those that may be hosted by scalable web services provider. As discussed in greater detail below, such distributed storage systems may be configured such that clustered storage capabilities provided by a containerized storage service provider enable stateful implementation of application instances by the scalable web services provider.

As will be discussed in greater detail below, such methods may be implemented for application instances, or groups of application instances. In a specific example, an application instance may be a virtual machine, such as one implemented with Apache Cassandra, that has been assigned physical storage devices upon startup and instantiation. However, as will also be discussed below with reference to FIG. 6, if the application instance that is a virtual machine, and/or the node on which it is implemented, is unexpectedly terminated, the underlying storage devices across which the storage volume was partitioned may be orphaned, because while conventional web services may track some aspects of application instances, they do not track underlying physical devices. Accordingly, embodiments disclosed herein provide the ability to reattach such physical devices when the virtual machine is re-instantiated and spun up.

At 502 application instance parameters may be received. In various embodiments, the application instance may be an instance of an application that is hosted by a scalable web services provider, such as Amazon™ Elastic Compute Cloud, Google Compute, or Microsoft Azure. Accordingly, the application instance parameters may identify various features and characteristics of an application instance to be implemented in a cloud computing environment. In some embodiments, such application instance parameters may identify various aspects and features of the applications, such as storage requirements, operating system type, and other system requirements. More specifically, the application instance parameters may identify a type and number of storage volumes to create to implement the application instance.

In various embodiments, the application instance parameters may be retrieved from a predetermined template of the application instance. For example, the application instance may be a particular instance of an application, such as a containerized application. Accordingly, the template may identify various parameters such as a type of machine utilized, I/O constraints associated with such an application, as well as characteristics of data provisioning and storage for such an application that may have been determined during the initial setup and configuration of the application. In this way, parameters and characteristics of the underlying application may be used to infer parameters of a particular application instance.

At 504, unattached storage volumes associated with the application instance may be enumerated. As similarly discussed above, the scalable web services provider may operate and maintain several storage volumes which may be used to implement block devices. In various embodiments, unattached storage volumes may be storage volumes that are not currently associated with a particular application instance, as may be indicated by a flag or identifier associated with the storage volume. Accordingly, the unattached storage volumes may be identified and enumerated by a containerized storage service provider, such as Portworx™. In this way, the containerized storage service provider may identify unattached storage volumes of the scalable web services provider, and further identify one or more characteristics or features of the identified storage volumes.

In various embodiments, the unattached storage volumes may be identified based on characteristics of the storage volumes and/or their underlying physical devices, as well as the previously discussed application instance parameters. For example, storage volumes having characteristics, such as storage capacity and I/O capacity, matching characteristics represented by the application instance parameters, which may have been determined based on a template, may be identified and enumerated as viable unattached storage volumes. In various embodiments, a system component, such as a particular node or a coordinator node, may query nodes in the cluster to determine if such unattached storage volumes exist.

At 506, it may be determined if there are unattached storage volumes that match the application instance parameters. In various embodiments, such a determination may be made based on a comparison of features of the identified unattached storage volumes with the received application instance parameters. For example, the application instance parameters may identify a particular operating system, file system compatibility, and/or input/output (I/O) requirement. Such parameters may be compared against features of each of the unattached storage volumes, and one or more matching storage volumes may be identified.

If it is determined that there are unattached storage volumes that match the application instance parameters, the identified storage volumes may be assigned to the application instance at 508. More specifically, the containerized storage service provider assigns the identified storage volumes to the application instance, and such assignments may be tracked and monitored. As will be discussed in greater detail below, the containerized storage service provider may also assign a cluster node identifier to the storage volumes that are being assigned. In this way, the identified storage volumes may be included in a cluster operated and maintained by the containerized storage service provider, and may be initialized as discussed above with reference to FIG. 4.

Returning to 506, if it is determined that here are no unattached storage volumes that match the application instance parameters, new storage volumes may be created for the application instance at 510. Accordingly, the containerized storage service provider may create one or more storage volumes and assign those storage volumes to the application instance that has been created by the scalable web services provider. In various embodiments, the storage volumes may be created dynamically and in response to the receive parameters. More specifically, the storage volumes may be created based on the received parameters and may be configured to implement the features specified by the receive parameters. In this way, the containerized storage service provider may create storage volumes specifically configured for the application instance.

In some embodiments, one or more cluster parameters may prevent the creation of a new storage volume. For example, a cluster maximum may already have been met, and there might not be any available room to create new storage volumes in the cluster. Accordingly, at 510, one or more storageless, or head-only, nodes may be created and assigned to the application instance.

At 512, the new storage volumes may be identified as new cluster nodes joining the cluster. As similarly discussed above, the containerized storage service provider may assign cluster node identifiers to the newly created storage volumes. In this way, the storage volumes that have just been created may be included in a cluster operated and maintained by the containerized storage service provider, and may be initialized as discussed above with reference to FIG. 4.

In various embodiments, storage volumes and/or underlying physical devices assigned to the application instance may be tracked by a system component such as a coordinator node, which may be one of the storage container nodes discussed above with reference to FIG. 2, or a metadata server, which may be implemented in conjunction with the application image registry also discussed above with reference to FIG. 2. In this way, the relationship and assignment of storage volumes and underlying physical devices may be tracked by a containerized storage service provider, even for application instances and storage volumes implemented by a scalable web services provider. Such information may be stored as custom labels and/or tags that may be stored at the cluster level and/or at a system component, such as the metadata server.

Figure 6:
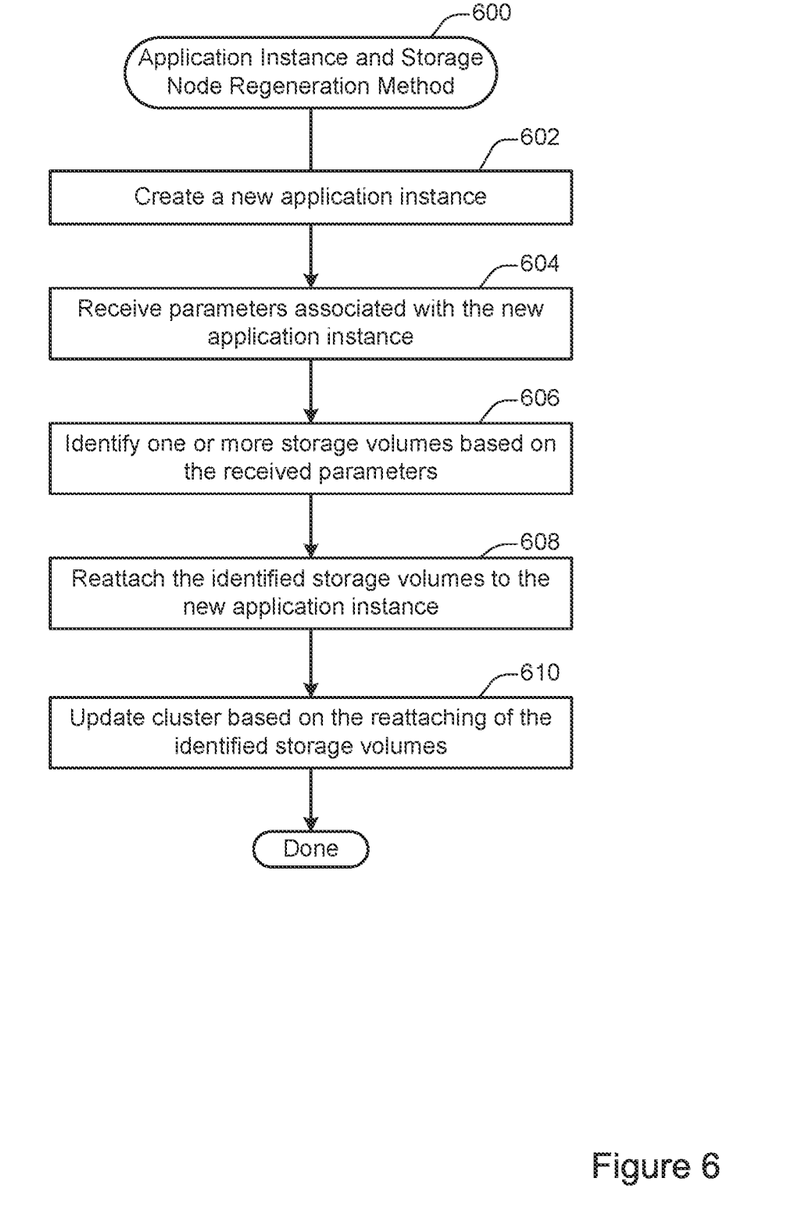
FIG. 6 illustrates a flow chart of an example of a method for application instance and storage node regeneration, performed in accordance with one or more embodiments.

FIG. 6 illustrates a flow chart of an example of a method for application instance and storage node regeneration. As previously discussed, application instances and associated storage nodes may be terminated as may be the case, in some embodiments, with an unexpected termination of the application or a storage node failure. As will be discussed in greater detail below, various embodiments disclosed herein provide the ability to recreate the application instance and reattach previously utilized storage volumes to recreate the application instance and/or regenerate the storage node in a stateful manner.

At 602, a new application instance may be created. As similarly discussed above, an application instance may be an application that is hosted by a scalable web services provider. As also discussed above, application instances may be created and terminated in accordance with their usage and corresponding instantiation. Accordingly, the application instance that is created at 602 may have been previously created, but terminated. Accordingly, the application instance, as well as a node upon which it is implemented, may have had several associated storage volumes and underlying physical devices at the time it was terminated, as will be discussed in greater detail below.

At 604, parameters associated with the new application instance may be received. As similarly discussed above with reference to FIG. 5, application instance parameters may identify various features and characteristics of the application instance, such as storage requirements, operating system type, and other system requirements. In various embodiments, the parameters may further include one or more other identifiers, such as a cluster identifier that may have been tracked and stored by a system component, such as a coordinator node or a metadata server. Accordingly, features and characteristics of the underlying application may be various features that may be used as application instance parameters, such as storage capacity, I/O characteristics, and geographical location information. In various embodiments, additional information may be retrieved from a metadata server if appropriate.

At 606, one or more storage volumes may be identified based on the received parameters. In various embodiments, a containerized storage service provider, such as Portworx™, may query nodes and storage volumes within an identified cluster to determine if any unattached storage volumes exist that match the application instance parameters. As previously discussed, the cluster identifier may have been determined based on previously stored data associated with the application instance that failed. Accordingly, one or more matching unattached volumes and/or nodes may be identified in the cluster. Moreover, particular unattached volumes may be further identified based on features or characteristics of the new application instance as well as previously stored identifiers associated with the storage volumes. As previously discussed, a system component of the containerized storage service provider, such as a coordinator node or metadata server, may be configured to track which storage volume is being used with which application instance. Accordingly, such information may be stored at the system component and/or propagated amongst the nodes in the cluster. In various embodiments, such information, which may be custom tags and/or labels, may be used to identify particular storage volumes of the unattached storage volumes.

In some embodiments, additional storage volumes may also be implemented in a cluster operated by a scalable web services provider, such as Amazon™ Elastic Compute Cloud. Accordingly, the scalable web services provider may be queried to identify matching storage volumes if appropriate. In this way, the containerized storage service provider may implement the reattachment of storage volumes implemented in clusters maintained by the containerized storage service provider as well as clusters maintained by the scalable web services provider.

At 608, the identified storage volumes may be reattached to the new application instance. Accordingly, the identified storage volumes may be assigned to the application instance, and data previously stored in the storage volumes may be accessible by the application instance. In this way, data stored in storage volumes by an application instance may again be accessible despite its termination and recreation. Accordingly, the application instance may be implemented in a stateful manner, and may provide protection against unexpected termination of the application instance, as may occur during a node failure.

At 610, the cluster may be updated based on the reattaching of the identified storage volumes. Accordingly, updated storage node information may be propagated throughout the cluster such that all other nodes in the cluster are update and include the most recent data characterizing the storage volumes included in the cluster as well as one or more characteristics of those storage volumes, such as associated application instances and storage capacities.

Figure 7:
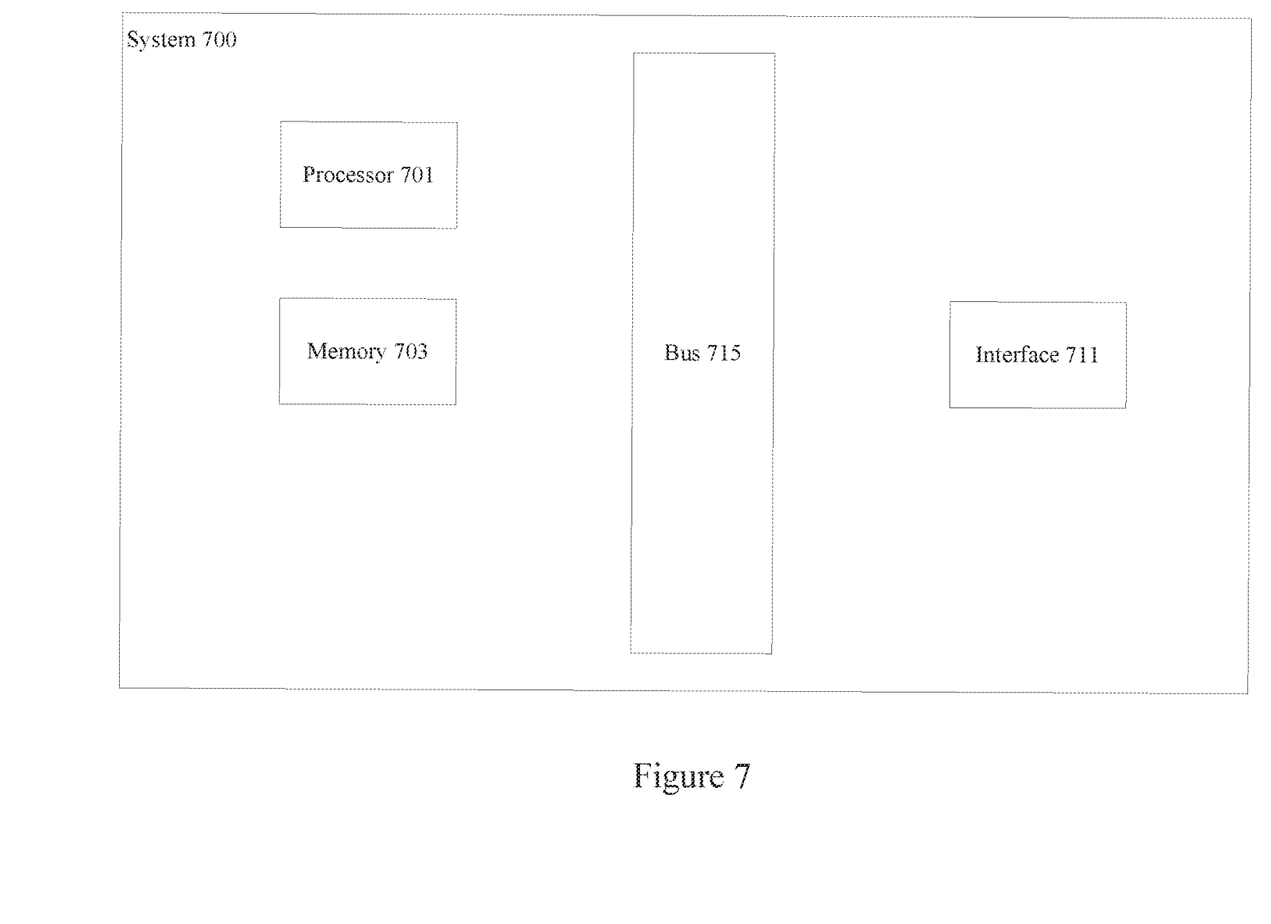
FIG. 7 illustrates an example of a server.

FIG. 7 illustrates one example of a server. According to particular embodiments, a system 700 suitable for implementing particular embodiments of the present invention includes a processor 701, a memory 703, an interface 711, and a bus 715 (e.g., a PCI bus or other interconnection fabric) and operates as a storage container node. When acting under the control of appropriate software or firmware, the processor 701 is responsible for containerized storage operations, as discussed above. Various specially configured devices can also be used in place of a processor 701 or in addition to processor 701. The interface 711 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 700 is a server configured to run a container engine. For example, the system 700 may be configured as a storage container node as shown in FIG. 1. The server may include one or more hardware elements as shown in FIG. 7. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
    determining that a first instance of an application is running;
    determining that the first instance of the application is terminated;
    instantiating, in response to the determining that the first instance is terminated, a second instance of the application;
    identifying one or more particular storage volumes based on the first instance; and
    attaching the one or more particular storage volumes to the second instance, wherein the identifying of the one or more particular storage volumes includes:
        identifying a cluster associated with the first instance;
        identifying one or more unattached storage volumes in the cluster based on one or more application instance parameters of the second instance; and
        identifying, from the one or more unattached storage volumes, the one or more particular storage volumes previously attached to the first instance.

2. The method of claim 1, wherein:
    the identifying of the one or more particular storage volumes previously attached to the first instance is based on one or more of a custom tag or a label stored by a coordinator node or a metadata server.

3. The method of claim 1, wherein the identifying of the one or more unattached storage volumes includes:
    identifying the one or more unattached storage volumes in the cluster that match the one or more application instance parameters of the second instance.

4. The method of claim 1, wherein:
    the one or more application instance parameters of the second instance include one or more of a type of storage volume, a number of storage volumes, a storage capacity, an operating system type, or an input/output characteristic to implement the second instance.

5. The method of claim 1, wherein:
    the first instance and the second instance are operated by a scalable web services provider; and
    the cluster is operated by a containerized storage service provider.

6. The method of claim 1, wherein the identifying of the one or more particular storage volumes includes:
    identifying, in one or more clusters operated by a containerized storage service provider and one or more clusters operated by a scalable web services provider, one or more unattached storage volumes based on one or more application instance parameters of the second instance; and
    identifying, from the one or more unattached storage volumes, the one or more particular storage volumes previously attached to the first instance.

7. The method of claim 1, wherein:
    the first instance is terminated due to one or more of a failure of the first instance or a failure of a node on which the first instance is implemented.

8. The method of claim 1, wherein:
    the application is a containerized stateful application.

9. The method of claim 1, wherein:
    a particular storage volume among the one or more particular storage volumes includes storage resources aggregated from a plurality of storage devices.

10. A system comprising:
    a memory storing instructions; and
    a processor communicatively coupled to the memory and configured to execute the instructions to:
        determine that a first instance of an application is running;
        determine that the first instance of the application is terminated;
        instantiate, in response to the determining that the first instance of the application is terminated, a second instance of the application;
        identify one or more particular storage volumes based on the first instance; and
        attach the one or more particular storage volumes to the second instance, wherein the identifying of the one or more particular storage volumes includes:
            identifying a cluster associated with the first instance;
            identifying one or more unattached storage volumes in the cluster based on one or more application instance parameters of the second instance; and
            identifying, from the one or more unattached storage volumes, the one or more particular storage volumes previously attached to the first instance.

11. The system of claim 10, wherein:
    the identifying of the one or more particular storage volumes previously attached to the first instance is based on one or more of a custom tag or a label stored by a coordinator node or a metadata server.

12. The system of claim 10, wherein the identifying of the one or more unattached storage volumes includes:
    identifying the one or more unattached storage volumes in the cluster that match the one or more application instance parameters of the second instance.

13. The system of claim 10, wherein:
the one or more application instance parameters of the second instance include one or more of a type of storage volume, a number of storage volumes, a storage capacity, an operating system type, or an input/output characteristic to implement the second instance.

14. The system of claim 10, wherein:
the first instance and the second instance are operated by a scalable web services provider; and
the cluster is operated by a containerized storage service provider.

15. The system of claim 10, wherein the identifying of the one or more particular storage volumes includes:
identifying, in one or more clusters operated by a containerized storage service provider and one or more clusters operated by a scalable web services provider, one or more unattached storage volumes based on one or more application instance parameters of the second instance; and
identifying, from the one or more unattached storage volumes, the one or more particular storage volumes previously attached to the first instance.

16. The system of claim 10, wherein:
the first instance is terminated due to one or more of a failure of the first instance or a failure of a node on which the first instance is implemented.

17. The system of claim 10, wherein:
the application is a containerized stateful application.

18. A non-transitory computer-readable medium storing instructions that, when executed, direct a processor of a computing device to:
determine that a first application instance of an application is running;
determine that the first instance of the application is terminated;
instantiate, in response to the determining that the first instance of the application is terminated, a second instance of the application;
identify one or more particular storage volumes based on the first instance; and
attach the one or more particular storage volumes to the second instance, wherein the identifying of the one or more particular storage volumes includes:
identifying a cluster associated with the first instance;
identifying one or more unattached storage volumes in the cluster based on one or more application instance parameters of the second instance; and
identifying, from the one or more unattached storage volumes, the one or more particular storage volumes previously attached to the first instance.

\* \* \* \* \*